United States Patent [19]

Piel et al.

[11] Patent Number: 4,491,529

[45] Date of Patent: Jan. 1, 1985

[54] HEAT ACCUMULATING AGENT

[75] Inventors: Vera Piel; Johann Schröder, both of Aachen, Fed. Rep. of Germany

[73] Assignee: U.S. Philips Corporation, New York, N.Y.

[21] Appl. No.: 518,274

[22] Filed: Jul. 28, 1983

[30] Foreign Application Priority Data

Nov. 5, 1982 [DE] Fed. Rep. of Germany ....... 3240855

[51] Int. Cl.$^3$ .............................................. C09K 5/06
[52] U.S. Cl. ..................................... 252/70; 423/266; 423/497
[58] Field of Search ................... 252/70; 423/266, 497

[56] References Cited

FOREIGN PATENT DOCUMENTS

| | | | |
|---|---|---|---|
| 55-45730 | 3/1980 | Japan | 252/70 |
| 57-151675 | 9/1982 | Japan | 252/70 |
| 2001096 | 1/1979 | United Kingdom | 252/70 |

*Primary Examiner*—Paul Lieberman
*Assistant Examiner*—Robert A. Wax
*Attorney, Agent, or Firm*—Norman N. Spain

[57] ABSTRACT

The use of calcium chloride hexahydrate as a heat accumulating agent for latent heat accumulators is improved when as a nucleating agent (so as to avoid supercooling) special caesium salts, bismuth salts and/or lead salts are used.

10 Claims, No Drawings

HEAT ACCUMULATING AGENT

The invention relates to a heat accumulating agent having a solid-liquid phase transition on the basis of calcium chloride hexahydrate and a nucleating agent.

Due to its high thermal capacity (1.44 kJ/kg K for the solid phase and 2.32 kJ/kg K for the liquid phase), its high heat of fusion (258 kJ/dm$^3$) and its favourable melting point (29° C.), calcium chloride hexahydrate is a very suitable heat accumulating agent, for example, for heating systems in connection with heat pumps, solar energy collectors, community heating systems and heat recovery devices. However, it has the very disadvantageous property of remaining liquid upon cooling below the melting point and on supercooling 20° to 30°. In this case the stored heat of fusion cannot be extracted and used.

It is known to reduce the undercooling of calcium chloride hexahydrate by the addition of barium salts and strontium salts (DE-AS 27 31 572, EP-OS 13 569, JP-OS 56-8483 and 56-8484). These nucleating agents have the disadvantage of being poisonous.

It is furthermore known that caesium- and/or rubidium aluminum sulphate may be added to prevent supercooling of ammonium- or potassium aluminum sulphate (JP-OS 55-45730) and that lead nitrate, lead chloride and/or barium sulphate may be added to prevent supercooling of sodium carbonate decahydrate (FR-OS 23 96 061). In principle nucleating agents have only a very selective effect on the crystallization of very specific compounds. Nor does there exist a useful theory or rule according to which one may proceed to find active nucleating agents for a certain accumulating agent. So it is rather a very rare exception than a predictable effect when a certain compound happens to also act as a nucleating agent on another heat accumulating agent. Furthermore there still exists a strong need to have available further nucleating agents for notoriously good heat accumulating agents such as calcium chloride hexahydrate.

It is the object of the invention to provide a heat accumulating agent on the basis of calcium chloride hexahydrate with a more effective nucleating agent.

According to the invention this object is achieved in that the heat accumulating agent comprises as a nucleating agent caesium chlorate, caesium alumdodecahydrate, bismuth phosphate, bismuth tartrate hexahydrate, basic bismuth carbonate, bismuth hydroxide, lead carbonate, lead oxalate and/or lead phosphate.

It has furthermore been found that these special caesium salts, bismuth salts and lead salts effectively reduce the supercooling of calcium chloride hexahydrate. The advantage of these special caesium salts and bismuth salts resides in the fact that they are not poisonous and are active already in a comparatively small quantity. Although the lead salts are poisonous, they have the advantage of a very low solubility and of the associated very small quantity which is required as an addition for the nucleation; moreover, the lead salts are cheaper than the known nucleating agents. It is therefore sufficient to add said nucleating agents in the quantities indicated in the table.

The invention will be described in greater detail with reference to a few examples which are listed in the following table. The full activity of the nucleating agents recorded therein is given only after completing a few storage cycles (approximately 5 to 10 times melting and freezing). The quantity of the nucleating agent has been designated in the examples in grams per 100 cm$^3$ of the CaCl$_2$.6H$_2$O. It may also be designated in terms of equivalent grams of CaCl$_2$.6H$_2$O which on the basis of the density of the CaCl$_2$.6H$_2$O of 1.71 is 58.5 grams per 100 cm$^3$.

| Example No. | Nucleating agent | Formula | Solubility g/100 cm$^3$ H$_2$O | Optimum added quantity g/100 cm$^3$ CaCl$_2$.6H$_2$O | Added quantity used in the example g/100 cm$^3$ CaCl$_2$.6H$_2$O | Supercooling degrees below melting point (29° C.) |
|---|---|---|---|---|---|---|
| 1 | Caesium perchlorate | CsClO$_4$ | 1.17 | 1.0 to 2.0 | 1.0 | 1 to 3 |
| 2 | Caesiumalum | CsAl(SO$_4$)12H$_2$O | 0.35 | 0.4 to 1.0 | 0.5 | 1 to 2 |
| 3 | Bismuth phosphate | BiPO$_4$ | insoluble | 0.05 to 0.5 | 0.1 | 3 to 5 |
| 4 | Bismuth tartrate | Bi$_2$(C$_4$H$_4$O$_6$)$_3$6H$_2$O | insoluble | 0.05 to 0.5 | 0.1 | 2 to 4 |
| 5 | Basic bismuth carbonate | Bi$_2$O$_2$CO$_3$ | insoluble | 0.05 to 0.5 | 0.1 | 1 to 3 |
| 6 | Bismuth hydroxide | Bi(OH)$_3$ | 0.00014 | 0.05 to 0.5 | 0.1 | 4 to 6 |
| 7 | Lead carbonate | PbCO$_3$ | $1.1 \times 10^{-4}$ | 0.3 to 1.0 | 0.3 | 2 to 3 |
| 8 | Lead oxalate | PbC$_2$O$_4$ | $1.6 \times 10^{-4}$ | 0.3 to 1.0 | 0.3 | 2 to 3 |
| 9 | Lead phosphate | Pb$_3$(PO$_4$)$_2$ | $1.4 \times 10^{-5}$ | 0.2 to 1.0 | 0.2 | 3 to 4 |

What is claimed is:

1. A heat accumulating agent having a solid-liquid phase transition comprising calcium chloride hexahydrate and a nucleating agent selected from the group consisting of caesium chlorate, caesium alum dodecahydrate, bismuth phosphate, bismuth tartrate hexahydrate, basic bismuth carbonate, bismuth hydroxide, lead carbonate, lead oxalate and lead phosphate.

2. A heat accumulating agent as claimed in claim 1, characterized in that it comprises as a nucleating agent caesium perchlorate in a quantity of 1 to 2 g per to 58.5 g of CaCl$_2$.6H$_2$O.

3. A heat accumulating agent as claimed in claim 1, characterized in that it comprises as a nucleating agent caesium alumdodecahydrate in a quantity of 0.4 to 1.0 g related to 58.5 g of CaCl$_2$.6H$_2$O.

4. A heat accumulating agent as claimed in claim 1, characterized in that it comprises as a nucleating agent bismuth phosphate in a quantity of 0.05 to 0.5 g per to 58.5 g of CaCl$_2$.6H$_2$O.

5. A heat accumulating agent as claimed in claim 1, characterized in that it comprises as a nucleating agent bismuth tartrate hexahydrate in a quantity of 0.05 g to 0.5 g per to 58.5 g of $CaCl_2.6H_2O$.

6. A heat accumulating agent as claimed in claim 1, characterized in that it comprises as a nucleating agent basic bismuth carbonate in a quantity of 0.05 to 0.5 g per to 58.5 g of $CaCl_2.6H_2O$.

7. A heat accumulating agent as claimed in claim 1, characterized in that it comprises as a nucleating agent bismuth hydroxide in a quantity of 0.05 to 0.5 g per to 58.5 g of $CaCl_2.6H_2O$.

8. A heat accumulating agent as claimed in claim 1, characterized in that it comprises as a nucleating agent lead carbonate in a quantity of 0.3 to 1.0 g per to 58.5 g of $CaCl_2.6H_2O$.

9. A heat accumulating agent as claimed in claim 1, characterized in that it comprises as a nucleating agent lead oxalate in a quantity of 0.3 to 1.0 g per to 58.5 g of $CaCl_2.6H_2O$.

10. A heat accumulating agent as claimed in claim 1, characterized in that it comprises as a nucleating agent lead phosphate in a quantity of 0.2 to 1.0 g per to 58.5 g of $CaCl_2.6H_2O$.

* * * * *